United States Patent [19]

Walston et al.

[11] Patent Number: 4,581,953
[45] Date of Patent: Apr. 15, 1986

[54] MOLDED TERMINAL WITH VIBRATION DAMPENER POCKET

[75] Inventors: Holly Walston, Utica; Arthur L. Spease, Livonia, both of Mich.

[73] Assignee: Teleflex Incorporated, Limerick, Pa.

[21] Appl. No.: 697,025

[22] Filed: Jan. 31, 1985

Related U.S. Application Data

[63] Continuation of Ser. No. 392,383, Jun. 28, 1982, abandoned.

[51] Int. Cl.⁴ .............................................. F16C 1/14
[52] U.S. Cl. ................................. 74/501 R; 74/502; 74/501 P; 403/76; 403/122
[58] Field of Search ................. 74/501 R, 501 P, 502; 403/67, 71, 76, 122, 141, 163

[56] References Cited

U.S. PATENT DOCUMENTS

| | | | |
|---|---|---|---|
| 2,859,060 | 11/1958 | Davies et al. | 403/122 |
| 3,037,787 | 6/1962 | Gottschald | 403/76 |
| 3,329,455 | 7/1967 | Becker et al. | 403/76 |
| 3,380,774 | 4/1968 | Brodersen et al. | 403/76 |
| 4,111,570 | 9/1978 | Morel | 403/141 |
| 4,220,418 | 9/1980 | Kondo et al. | 403/76 |
| 4,327,600 | 3/1982 | Bennett | 74/501 R |

Primary Examiner—Kenneth J. Dorner
Assistant Examiner—Rodney M. Lindsey
Attorney, Agent, or Firm—Harold W. Milton, Jr.

[57] ABSTRACT

A motion transmitting remote control assembly (10) for transmitting motion in a curved path including a tube member (14) and a rod (18) movably supported by the tube member (14) and extending therefrom to provide a variable extending length of the rod member (18) between the tube member (14) and one end (20) thereof to define a line of force. An integral terminal member (22) operatively interconnects the extending length of the rod member (18) and a control member (24). The terminal member (22) has an opening (36) therethrough defining an axis which is perpendicular relative to the line of force. The assembly (10) is characterized by the terminal member (22) including a resilient vibration dampening member (38) totally encapsulated therein and defining a portion of the opening (36) and including a retaining pocket for retaining a portion (32) of the control member (24) therein.

12 Claims, 4 Drawing Figures

MOLDED TERMINAL WITH VIBRATION DAMPENER POCKET

This is a continuation of application Ser. No. 392,383, filed on June 28, 1982, and now abandoned.

TECHNICAL FIELD

This invention relates to a motion transmitting remote control assembly for transmitting motion in a curved path.

BACKGROUND ART

Push-pull motion transmitting remote control assemblies are well suited as actuators for such uses as with brake and transmission assemblies. The motion transmitting remote conrol assemblies generally include a flexible core element supported for linear movement within a conduit. A terminal member is mounted on the end portion of the core element to interconnect the core element in a control member such as a lever. Noise isolation between the core element and lever are often required to prevent the transduction of vibrations and the resulting noise. Presently, terminal members are used which are integral members molded onto the end portion of the core element. For example, the U.S. Pat. No. 4,327,600 to Bennett discloses a push-pull assembly including a terminal member having a resilient member disposed in the passageway thereof for cushioning the control member for preventing the transmission of vibration between the control member and the core element. The invention of this Bennett patent is well suited for supporting a rod member extending therethrough. The instant invention provides a terminal member including vibration dampening means adapted for supporting and retaining a ball pin therewithin rather than a rod, the ball pin extending from a body portion of a projection connected to or integrally extending from a control member.

STATEMENT OF INVENTION

According to the present invention, there is provided a motion transmitting remote control assembly for transmitting motion in a curved path including guide means and core means movably supported by the guide means and extending therefrom to provide a variable extending length of the core means between the guide means in one end thereof to define a line of force. An integral terminal member operatively interconnects the extending length of the core means and a control member and has an opening therethrough defining an axis which is perpendicular relative to the line of force. The assembly is characterized by the terminal member including vibration dampening means totally encapsulated therein and defining a portion of the opening. The vibration dampening means includes a retaining pocket for retaining a portion of the control member therein.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
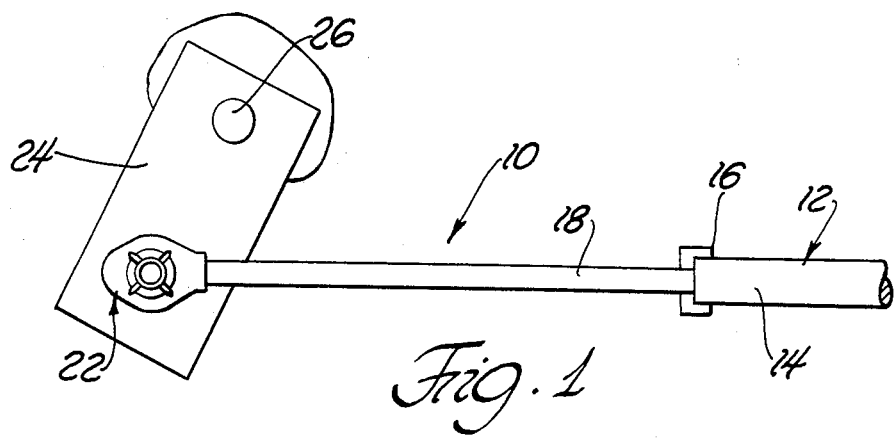
FIG. 1 is a schematic elevational view of a motion transmitting remote control assembly constructed in accordance with the instant invention.
Figure 2:
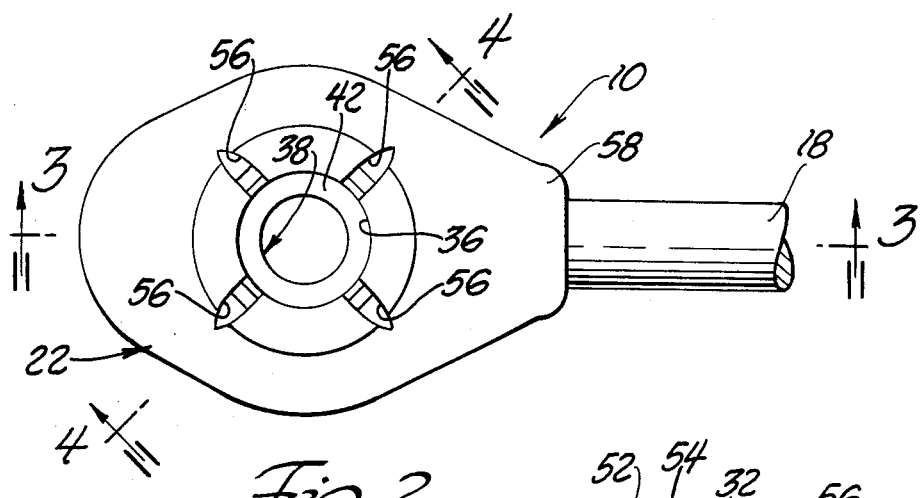
FIG. 2 is an enlarged fragmentary plan view of a terminal member of the instant invention.

Referring to the drawings, a motion transmitting remote control assembly for transmitting motion in a curved path is generally shown at 10.

The assembly (10) includes guide means generally indicated at 12, the guide means 12 including a flexible conduit (not shown) connected to a tube member 14. The tube member 14 is generally connected to the flexible conduit by a swivel joint to allow for swivelling movement of the tube member 14 relative to the conduit. A wiper member 16 is mounted on the end portion of the tube member 14. The assembly 10 further includes core means comprising a flexible core element supported within the conduit and having a rod member 18 fixedly secured to the end of the flexible core element and disposed within the tube member 14 and extending therefrom to provide a variable extending length of the rod member 18 between the tube member 14 and one end 20 of the rod member 18. The rod member 18 defines a line of force as the rod member 18 is actuated to move into and out of the tube member 14. The wiper member 16 engages the rod member 18 to prevent foreign particulate matter from entering the tube member 14.

The assembly 10 further includes an integral terminal member generally indicated at 22 for operatively interconnecting the extending length of the rod member 18 and a control member 24. The control member 24 may take the form of a lever 24 supported upon a rotatable actuating shaft 26 whereby, upon longitudinally movement of the rod member 18 along the line of force defined thereby, the lever 24 will be rotated which, in turn, rotatss the actuating shaft 26. The terminal member 22 is pivotally mounted upon a projection, generally indicated at 26, and shown in phantom FIG. 3. The projection 26 may be an integral projection extending from the lever 24 or the projection 26 may include a threaded portion 28 to be threadedly connected to a threaded bore in the lever 24. The projection 26 includes a body portion 30 and a ball pin 32 extending therefrom. A flange 34 extends outwardly from the body portion 30.

The terminal member 22 has an opening 36 therethrough defining an axis which is perpendicular relative to the line of force defined by the rod member 18. When the terminal member 22 is mounted on the projection 26, the axis defined by the opening 36 is substantially parallel to the axis of rotation of the actuating shaft 26. As the rod member 18 is moved into and out of the tube member 14, the terminal member 22 pivots about the ball pin 32 as the lever 24 is pivotted about the axes of rotation defined by the actuating shaft 26 so as to rotate the actuating shaft 26.

The assembly 10 is characterized by the terminal member 22 including resilient vibration dampening means, generally indicated at 38, which is totally encapsulated within the terminal member 22. The vibration dampening means 38 is a resilient vibration dampening member 38, the terminal member 22 being an organic polymeric material which is molded about the vibration dampening member 38 so as to totally encapsulate it therein. The vibration dampening member 38 defines a portion of the opening 36 and includes a retaining pocket for retaining the ball pin 32 of the projection 26 extending from the lever 24 therein. More specifically, the retaining pocket includes a cylindrical wall 40 and an annular integral lip 42 extending into the opening 36 from the vibration dampening member 38 for engaging and retaining the ball pin 32 extending from the projection 26 within the cylindrical wall 40. By providing a resilient retaining rib 42 and encapsulating the ball pin 32 within the resilient culindrical wall 40 of the vibration dampening member 38, vibrations transmitted to the ball pin 32 are effectively isolated and absorbed by the vibration dampening member 38. Thusly, the vibration dampening means 38 of the instant invention retains the ball pin 32 within the terminal member 22 and isolates vibrations emanating from the ball pin 32 from the terminal member 22 as well as vibrations emanating from the terminal member 22 being isolated from the ball pin 32.

The terminal member 22 includes containing means for containing the body portion 30 of the projection 26 of the lever 24. The vibration dampening member 38 includes a containing pocket extending from the lip 42 and away from the retaining pocket, the containing pocket including an integral cylindrical wall 44. The terminal member 22 includes an annular flange portion 46 extending about the end portion of the cylindrical wall 44 and, accordingly, the containing pocket, so as to define a remaining portion of the containing means continuous with the inner surface of the cylindrical wall 44. The cylindrical wall 44 and the flange portion 46 form a substantially cylindrical pocket for containing the cylindrical body portion 30 of the projection 26 extending from the lever 24. Alternatively, the cylindrical wall 44 and flange portion 46 may be of various configurations so as to be adapted to contain body portions 30 of projections 26 having various configurations. The body portion 30 is subjected to the lateral forces along the line of force during actuation of the assembly 10 and spares the ball pin 32 from being subjected to these forces. Hence, the instant invention provides a strong structural terminal 22 which also isolates vibrations transmitted thereto.

The terminal member 22 further includes abutment means for abutting the flange 34 extending outwardly from the body portion 30 of the projection 26 to limit the insertion of the body portion 30 into the opening 36. The abutment means includes a recessed shoulder portion 48 extending outwardly along the outer surface of the annular flange portion 46 of the terminal member 22 for abutting against the flange 34 of the projection 26. The shoulder portion 48 limits the insertion of the body portion 30 so that the ball pin 32 may pass through the retaining lips 42 but the body portion 30 of the projection 26 is retained within the containing means defined by the cylindrical wall 44 and flange portion 46.

Figure 3:
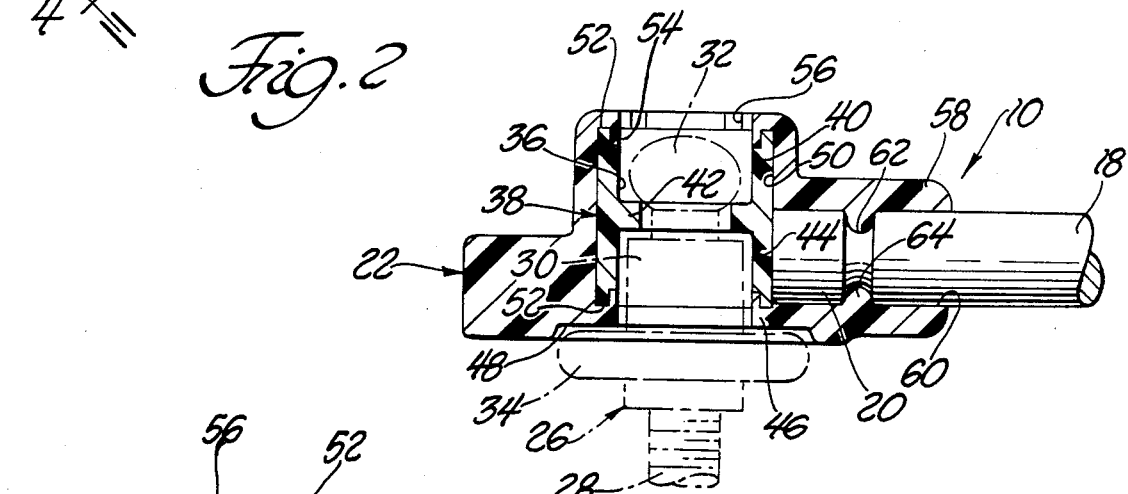
FIG. 3 is a cross-sectional view taken substantially along lines 3—3 of FIG. 2.
Figure 4:
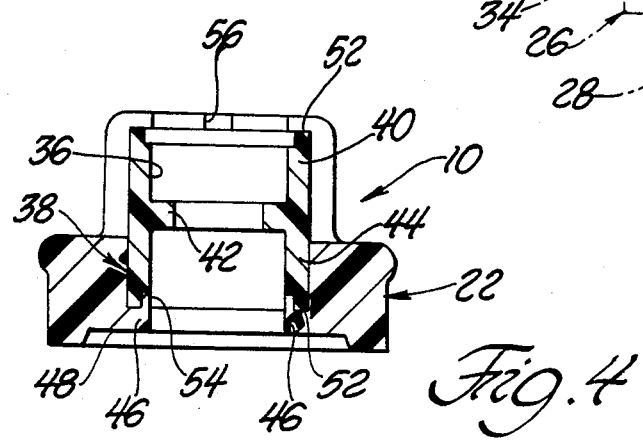
FIG. 4 is a cross-sectional view taken substantially along lines 4—4 of FIG. 2.

The terminal member 22 includes an annular wall 50 about the opening 36, the vibration dampening member 38 being disposed within the wall 50 and having a peripheral edge 52 at each end thereof. The terminal member 22 includes an annular ridge 54 which is hook-shaped when viewed in cross section, as shown in FIGS. 3 and 4 and defines the flange portion 46 of the containing means. The annular ridge 54 encapsulates each of the peripheral edges 52 of the vibration dampening member 38 so as to encapsulate the vibration dampening member 38 within the terminal member 22.

The terminal member 22 includes a plurality of slots 56 therethrough extending radially from the axis defined by the opening 36 about the retaining pocket of the opening 36. The slots 56 extend from the axis defined by the opening 36 at an angle relative to the line of force defined by the rod member 18, the angle being an acute angle relative to the line of force. More specifically, the terminal member 22 includes four slots 56, each of the slots 56 being disposed at an angle of 45° relative to the line of force. The slots provide flexibility to the retaining pocket about the vibration dampening member 38.

The terminal member 22 includes a neck portion 58 having a bore 60 extending radially relative to the opening 36 and parallel to the line of force defined by the rod member 18. As shown in FIG. 3, the end portion 20 of the rod member 18 is disposed within the bore 60. The end portion 20 of the rod member 18 includes an annular recessed portion 62. The neck portion 58 of the terminal member 22 includes an annular projection 64 extending into the bore 60 so as to engage the annular recess 62 thereby retaining the end portion 20 of the rod member 18 within the bore 60.

The bore 60 extends through the neck portion 58 and the wall 50. The end portion 20 of the rod member 18 is disposed within the bore 60 so that the end portion 20 abuts the vibration dampening member 38 within the bore 60. During the molding process of the terminal member 22, the vibration dampening member 38 is positioned on webs or vanes within a mold cavity of the forming molds, the rod member 18 being inserted into the mold so that the end portion 20 of the rod member 18 abuts against the vibration dampening member 38 thereby properly positioning the rod member 18 relative to the vibration dampening member 38. An organic polymeric materal is then injected into the mold cavity so as to encapsulate the vibration dampening member 38 and the end portion 20 of the rod member 18 within the terminal member 22. The webs support the vibration dampening member 38 and form the slots 56.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A motion transmitting remote control assemly (10) for transmitting motion in a curved path, said assembly (10) comprising: guide means (12); core means (18) movably supported by said guide means (12) and extending therefrom to provide a variable extending length of said core means (18) between said guide means (12) and one end (20) therefor to define a line of force; and an integral terminal member (22) for operatively interconnecting said extending length of said core means (18) and a control member (24) through a ball pin (32) and having an opening (36) therethrough defining an axis being perpendicular relative to said line of force, said terminal member (22) including a resilient integral vibration dampening member (38) totally encapsulated therein and defining a portion of said opening (36) and including a retaining pocket for retaining the ball pin (32) of the control member (24) therein, said retaining pocket including a resilient cylindrical wall (40) and an annular integral flexible flange (42) extending into said opening (36) from said wall (40) for engaging and retaining the ball pin (32) extending from the control member (24) within said cylindrical wall (40), said vibration dampening member (38) further including a resilient substantially cylindrical containing pocket extending from said flexible flange (42) and away from said retaining pocket.

2. An assembly as set forth in claim 1 further characterized by said terminal member (22) including an annular second flanged portion (46) extending about said containing pocket defining contiguous with said containing pocket a substantially cylindrical containing means for containing a cylindrical body portion (30) of the control member (24).

3. An assembly as set forth in claim 1 wherein the control members (24) includes a body portion (30) and a rigid flange (34) extending outwardly from the body portion (30) thereof further characterized by said terminal member (22) including abutment means for abutting said rigid flange (34) extending outwardly from the body portion (30) of the control member (24) to limit the insertion of the body portion (30) into said opening (36).

4. An assembly as set forth in claim 3 further characterized by said terminal member (22) including a second annular flanged portion (46) extending about said containing pocket said second annular flanged portion defining said abutment means (46) of said terminal member (22) including a recessed shoulder portion (48) for abutting against the rigid flange (34) of the control member (26).

5. An assembly as set forth in claim 4 further characterized by said terminal member (22) including an annular wall (50) about said opening (36), said vibration dampening member (38) being disposed within said wall (50) and having a peripheral edge (52) at each end thereof, said terminal member (22) including a pair of annular ridges (54) being hook-shaped when viewed in cross section and each of said ridges (54) encapsulating one of said peripheral edges (52) of said vibration dampening member (38).

6. An assembly as set forth in claim 1 further characterized by said terminal member (22) including a plurality of slots (56) therethrough extending radially from said axis defined by said opening (36) about said retaining pocket of said opening (36).

7. An assembly as set forth in claim 6 further characterized by each of said slots (56) extending from said axis at an angle relative to said line of force.

8. An assembly as set forth in claim 7 further characterized by each of said slots (56) being disposed at an acute angle relative to said line of force.

9. An assembly as set forth in claim 8 further characterized by said terminal member (22) including four of said slots (56), each of said slots (56) being disposed at an angle of 45° relative to said line of force.

10. An assembly as set forth in claim 1 further characterized by said terminal member (22) including a neck portion (58) having a bore (60) extending radially relative to said opening (36) and parallel to said line of force, said extending length having an end portion (20) of said core means (18) disposed within said bore (60).

11. An assembly as set forth in claim 10 further characterized by said bore (60) extending through said neck portion (58) to said vibration dampening member (38), said core means (18) including a rod member (18) defining said extending portion and including said end portion (20) thereof, said end portion (20) of said rod member (18) abutting said vibration dampening means (38) within said bore (60).

12. An assembly as set forth in claim 1 further characterized by said terminal member (22) being made of an organic polymeric material.

* * * * *